Patented Aug. 12, 1924.

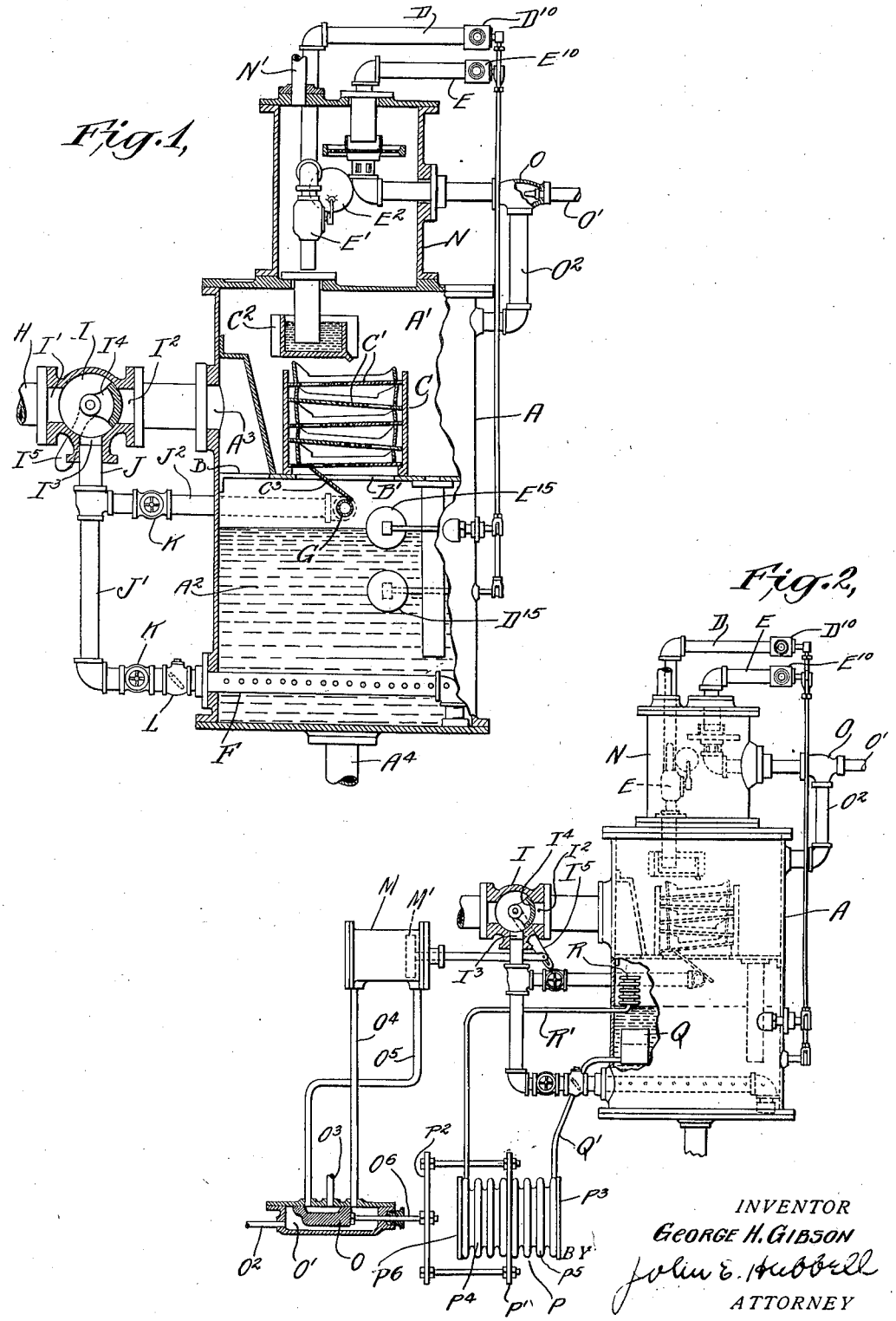

1,504,618

UNITED STATES PATENT OFFICE.

GEORGE H. GIBSON, OF MONTCLAIR, NEW JERSEY, ASSIGNOR TO H. S. B. W. COCHRANE CORPORATION, OF PHILADELPHIA, PENNSYLVANIA, A CORPORATION OF PENNSYLVANIA.

APPARATUS FOR WATER DEAERATION.

Application filed December 19, 1921, Serial No. 523,546. Renewed January 9, 1924.

*To all whom it may concern:*

Be it known that I, GEORGE H. GIBSON, a citizen of the United States, and resident of Montclair, in the county of Essex and State of New Jersey, have invented certain new and useful Improvements in Apparatus for Water Deaeration, of which the following is a specification.

The general object of my present invention is to provide improved apparatus for heating and deaerating water. In proceeding in accordance with the present invention the water to be deaerated is introduced into a deaerating chamber in film-like and broken streams as in any ordinary open feed water heater, and the water collecting in the bottom of the chamber is subjected to a reboiling or scrubbing action to expedite and augment the liberation of air from the latter, the air liberated being withdrawn from the apparatus through a suitable exhauster and the apparatus as a whole being ordinarily operated to entertain a pressure less than atmosphere in the heating and deaerating chamber. In regular operation the steam or a large portion of it utilized in heating and deaerating the water is injected into the pool or body of water in the bottom of the deaerating chamber. In starting apparatus of this sort into operation or in increasing the temperature maintained in the heating and deaerating chamber, a dangerous water hammer may be set up in the apparatus by injecting the steam into the water which is then at a temperature appreciably below that of the steam.

My present invention comprises improvements in valve mechanism and connections to the deaerating chamber whereby steam is admitted to the latter above the water level therein when necessary to raise the temperature in the apparatus to a point at which the steam or a large portion of it may be injected into the body of water in the bottom of the chamber without risk of serious water hammer. In one form of my invention I automatically control the supply of steam to the deaerating chamber in response to the temperature or pressure conditions therein.

The various features of novelty which characterize my invention are pointed out with particularity in the claims annexed to and forming a part of this specification. For a better understanding of the invention, however, reference should be had to the drawings and descriptive matter in which I have illustrated and described preferred embodiments of my invention.

Of the drawings:

Fig. 1 is a sectional elevation of apparatus comprising a manually controlled switch or steam distributing valve; and Fig. 2 is a sectional elevation illustrating a modification of the apparatus shown in Fig. 1 in which the steam distributing valve is thermostatically controlled.

In the drawings, and referring first to the construction shown in Fig. 1, I have illustrated the use of my invention in connection with water deaerating and heating apparatus comprising a closed chamber A divided into upper and lower compartments A' and $A^2$ respectively by a partition B. Mounted on the partition B is a tray box C open at its upper end to the compartment A' and open at its lower end to the compartment $A^2$ through the port B' in the partition. Air mixed with more or less water vapor is withdrawn from the compartment A' through a pipe $O^2$ leading to the mixing chamber of a steam ejector O supplied with steam by the pipe O' and discharging into a jet condenser N provided with an air outlet N' open to the atmosphere. A float actuated valve E' serves to pass water, and prevent the passage of air, from the condenser N into the compartment A'. The condensing water is supplied to the condenser N by a pipe E, and raw water to be deaerated is passed directly into the compartment A' by a pipe D. The supply of water through the pipes E and D is regulated by valve $E^{10}$ and $D^{10}$, respectively, which are automatically controlled by floats $E^{15}$ and $D^{15}$, respectively, which operate to normally maintain a substantial body of water in the lower portion of the compartment $A^2$ while limiting the height of water level therein to insure a vapor space in the upper portion of the compartment $A^2$. The water entering the compartment A' from the condenser N and through the pipe D is received in a trough $C^2$ and overflows from the latter onto trays or baffles C' in the tray box C. Steam for heating and deaerating the water is admitted to the compartment $A^2$ through a manifold F extending horizontally into the compartment $A^2$ well below the normal water level therein and provided with a multiplicity of discharge orifices, and through an atomizer pipe G arranged to direct a plurality of small steam jets across the path of flow of the water passing from the trays C' into the body of water in the lower portion of the compartment $A^2$. As shown the baffle $C^3$ directs the water falling from the trays over the atomizer. Steam is also introduced into the compartment $A^2$ above the water level therein through the inlet orifice $A^3$. $A^4$ represents the outlet for deaerated water.

In so far as above described the apparatus shown in Fig. 1 is merely illustrative of one of the many types of water heating and deaerating apparatus with which my invention may be employed. The particular form of apparatus shown in Fig. 1 comprises various features of construction and arrangement novel with me, but not claimed herein as they are disclosed and claimed in my copending applications, Serial No. 523,545 (Case 224) and Serial No. 523,547 (Case 235) filed of even date therewith.

The essential part of the apparatus shown in Fig. 1, in so far as the present invention is concerned, is a closed heating and deaerating chamber provided with water and air outlets, and with means for supplying water to the chamber in such manner as to maintain a body of water therein partially filling the chamber, and with regulable means for injecting steam into the chamber below the water level therein and also above the water level therein. In practice, moreover, the water introducing means should preferably include a water spreader such as is formed by the trays C' for passing the water introduced, through the vapor space in the upper portion of the chamber in a finely divided form.

The means with which my present invention is particularly concerned for regulating the distribution of steam among the steam inlets to the compartment $A^2$ comprises what I call a switch valve I. The valve I comprises a cylindrical valve casing having a steam inlet I' from a steam supply pipe H, and having an outlet port $I^2$ opening directly to the inlet $A^3$ of the compartment $A^2$ and having an outlet port $I^3$ connected to a pipe J. The latter is connected through a branch pipe J' to the manifold F, and through a branch pipe $J^2$ to the atomizer pipe G. A rotary valve member $I^4$, which may be manually adjusted through the external operating lever $I^5$, forms a means by which either of the ports $I^2$ and $I^3$ may be fully closed while leaving the other wide open, or to partially throttle each of these ports. Advantageously the branch pipes J' and $J^2$ each includes a valve K by which the corresponding flow of steam may be throttled or cut off, and the branch pipe J' preferably includes a non-return valve L operating to prevent back flow of water through the pipe J' in case the pressure in the steam supply pipe H falls below the pressure maintained in the compartment $A^2$.

In the normal intended operation of the apparatus shown in Fig. 1, the valve member $I^4$ is adjusted so that all, or at least the major portion of the steam passing from the pipe H into the valve I will issue from the latter through the port $I^3$ into the pipe J, and the valves K and the branch pipes J' and $J^2$ will be so adjusted that all, or a large portion of the steam issuing through the valve port $I^3$, will pass into the compartment A' through the manifold F. In normal operation the body of water in the bottom of the chamber A is approximately at the temperature of the steam admitted so that the latter passes through the body of water without condensation. The steam rising from the body of water carries with it the air scrubbed out of the water and is wholly or largely condensed in the vapor space above the body of water in heating the water passing down over the trays C'. In practice the apparatus should be so designed and operated that but little vapor will be mixed with the air carried out of the chamber A by the ejector O. In practice the temperature maintained in the chamber A will ordinarily be appreciably below 212°.

In starting the apparatus into operation, or when it is desired to raise the temperature in the deaerating chamber, the valve $I^4$ should be adjusted to close the port $I^3$ and open the port $I^2$, thus causing all the steam supplied to the apparatus to enter the compartment $A^2$ through the port $I^2$ until the compartment $A^2$ and its contents are warmed up approximately to the temperature of the entering steam. When the apparatus is thus warmed up the valve $I^4$ is adjusted into its normal position in which the port $I^3$ is opened and the port $I^2$ is closed or at least substantially throttled. By admitting all the steam supplied to the compartment $A^2$ above the water level in the latter when the temperature of the compartment and its contents is being raised, I avoid the danger of serious water hammer which would be apt to result from the introduction of steam into the water through the manifold F at that time.

The apparatus shown in Fig. 2 differs from that shown in Fig. 1 in that the operating arm $I^5$ of the switch valve I is connected to automatic control mechanism for adjusting the valve in response to temperature conditions prevailing in the deaerating chamber. The control mechanism comprises a motor cylinder M containing a piston M' the stem of which is connected to the valve $I^5$. A suitable pressure fluid such as compressed air for moving the piston M' in one direction or the other is admitted to and exhausted from the ends of the cylinder M by means of a D valve O working in a valve chest O' which is connected to a source of fluid under pressure by a pipe O². O³ represents the exhaust port from the valve chest O' and O⁴ and O⁵ represent the pipe connections from the valve chest O' to the opposite ends of the cylinder M. The stem O' of the D valve O is connected through a cross head P² and connecting rods to a diaphragm P' which forms the movable element of a differential pressure device which in the construction shown comprises fixed ends P⁶ and P³ and flexible bellow sections connecting each end head to the interposed member thus providing two expansible chambers P⁴ and P⁵. The chamber P⁵ is connected by a conduit O' to a rigid walled receptacle Q located in the tank A below the water level in the latter. The closed system comprising the pressure chamber P⁵, the receptacle Q and the connecting pipe Q' contains a volatile liquid such as water. The chamber P⁴ is connected by pipe R' to an expansible container R located in the tank A above the water level in the latter. The closed system comprising the chamber P⁴, the expansible chamber R and the pipe R' is filled with a non-volatile liquid such as a suitable oil.

The closed systems of which the containers Q and R form parts, respectively, should be so filled with fluid, and the apparatus otherwise so adjusted or calibrated that when, in normal operation, the containers Q and R are subjected to approximately the same pressures, the valve O, and thereby the switch valve member I⁴, will be held in the respective positions shown in Fig. 2; and so that when the pressure to which the expansible container R is subjected is appreciably above the pressure of saturated water vapor at the temperature of the body of water in which the container Q is immersed, the valve O will be shifted to the right and thereby cause the piston M' to move the valve member I⁴ into the position in which the port I² is open and the port I³ is closed.

With apparatus constructed as shown, the above described mode of operation can be secured by excluding air or other gas, aside from vapor of the contained liquid, from the closed system of which the container Q forms a part, while at the same time limiting the amount of liquid in the system to permit the necessary movement of the partition or rigid diaphragm P' to the right of the position shown in Fig. 3 which is required to shift the valve O into the position in which the pipe O⁴ is connected to the exhaust passage O³ through the chamber in the valve O when the container Q and the system of which it forms a part contains no vapor.

The pressure in the closed system of which the expansible vessel R forms a part, is the pressure actually prevailing in the chamber A above the water level therein, and the pressure in the closed system of which the rigid container Q forms a part, is the pressure of water vapor at the temperature of the body of water in which the chamber R is immersed provided the last mentioned system contains no air, and if it does contain a little air, the pressure is the total pressure of the air and vapor mixture in the system. In regular operation, the atmosphere surrounding the expansible vessel Q will be formed by the steam rising from the body of water and will contain only a relatively insignificant amount of air. In consequence the pressure to which the expansible vessel R is subjected will normally be approximately that of water vapor at the temperature of the body of water.

In starting the apparatus into operation, however, the pressure in the chamber A above the water body therein, owing to the presence of considerable air in the chamber, will be appreciably higher than the pressure of water vapor at the temperature of the water in the chamber. The distributing valve member I⁴ will then be held in the position in which it closes the port I³ and opens the port I². If, as a result in a change in the conditions of operation while steam is being supplied to the chamber A wholly or mainly through the manifold F, the temperature of the steam injected into the water through the manifold F becomes appreciably higher than the temperature of the water, much or all of the steam injected into the body of water will be condensed in the body of water. As a result of the consequent reduction in the amount of steam rising from the body of water, air will accumulate in the atmosphere then surrounding the expansible chamber R and, in consequence, the pressure of this air and vapor mixture will substantially exceed that of water vapor at the temperature of the body of water. As an immediate result of this increase in pressure on the outside of the vessel R the distributing valve member I⁴ will be adjusted to close the port I³ and open the port I². When thereafter the temperature of the body of water is brought approximately to the temperature of the steam supplied to the chamber A and the space about the expansible vessel R is swept practically clear of air, the distributing valve member I⁴ will be returned to its normal condition in which it closes the port I² and opens the port I³.

While in accordance with the provisions of the statutes I have illustrated and described the best forms of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention what I claim as new and desire to secure by Letters Patent, is:

1. Apparatus for deaerating water comprising in combination a closed chamber provided with water and air outlets, means for supplying water to be deaerated to said chamber as required to maintain the latter partially filled with water, and means for supplying steam to said chamber comprising a steam inlet opening to the chamber below the water level therein, a steam inlet opening to the chamber above the water level therein and a distributing valve adjustable to throttle the supply of steam to either inlet while permitting steam to pass freely to the other inlet.

2. Apparatus for deaerating water comprising in combination a closed chamber provided with water and air outlets, means for supplying water to be deaerated to said chamber as required to maintain the latter partially filled with water, means for supplying steam to said chamber comprising a steam inlet opening to the chamber below the water level therein, a steam inlet opening to the chamber above the water level therein, and a distributing valve comprising a valve chamber having two outlet ports connected one to one and the other to the second of said steam inlets, and a valve member movable to close either of said ports as desired while leaving the other wide open or to partially throttle each of said ports.

3. Apparatus for deaerating water comprising in combination a closed chamber provided with water and air outlets, means for supplying water to be deaerated to said chamber as required to maintain a body of water in the chamber partially filling the latter and in such manner that the water supplied will be heated in the chamber before joining said body of water, means for supplying steam to said chamber comprising one steam inlet opening to the chamber below the water level therein, a second steam inlet opening to the chamber above the water level therein, and means responsive to the temperature in said body of water and to the pressure in the space above the body of water for cutting off the supply of steam to said one inlet when the temperature of the body of water is below the temperature of saturated water vapor at the pressure in said space and for restricting the supply of steam to said second inlet when the temperature of saturated water vapor at the pressure in said space is approximately the same as the temperature of the water.

4. Apparatus for deaerating water comprising in combination a closed chamber provided with water and air outlets, means for supplying water to be deaerated to said chamber as required to maintain a body of water in the chamber partially filling the latter and in such maner that the water supplied will be heated in the chamber before joining said body of water, means for supplying steam to said chamber comprising one steam inlet opening to the chamber below the water level therein, a second steam inlet opening to the chamber above the water level therein and means jointly responsive to the temperature in said body of water and to the pressure in the space in said chamber above said body of water for throttling the supply of steam to said one inlet, or said second inlet accordingly as said pressure respectively exceeds or approximates that of water vapor at the temperature of said body of water.

5. Apparatus for deaerating water comprising in combination a closed chamber provided with water and air outlets, means for supplying water to be deaerated to said chamber as required to maintain a body of water in the chamber partially filling the latter and in such manner that the water supplied will be heated in the chamber before joining said body by steam in the chamber, means for supplying steam to said chamber comprising a steam inlet opening to the chamber below the water level therein, a steam inlet opening to the chamber above the water level therein and a distributing valve adjustable to throttle the supply of steam to either inlet while permitting the steam to pass to the other inlet and means for adjusting said valve in automatic response to variations in the differential between a pressure which is a function of the temperature of said body of water and the pressure in said chamber above said body of water.

Signed at Philadelphia in the county of Philadelphia and State of Pennsylvania this fourteenth day of December A. D. 1921.

GEORGE H. GIBSON.